United States Patent
Ryu et al.

(10) Patent No.: US 8,951,889 B2
(45) Date of Patent: Feb. 10, 2015

(54) LASER PROCESSING METHOD AND LASER PROCESSING APPARATUS

(75) Inventors: Beng So Ryu, Incheon-si (KR); Byong Shik Lee, Gyeonggi-do (KR); Hyeon Sam Jang, Gyeonggi-do (KR); Bum Joong Kim, Gyeonggi-do (KR)

(73) Assignees: QMC Co., Ltd., Anyangsi (KR); Beng So Ryu, Incheon (KR)

(*) Notice: Subject to any disclaimer, the term of this patent is extended or adjusted under 35 U.S.C. 154(b) by 900 days.

(21) Appl. No.: 13/088,024

(22) Filed: Apr. 15, 2011

(65) Prior Publication Data

US 2012/0190174 A1 Jul. 26, 2012

(30) Foreign Application Priority Data

Apr. 16, 2010 (KR) .................. 10-2010-0035137
Apr. 16, 2010 (KR) .................. 10-2010-0035138

(51) Int. Cl.
| | | |
|---|---|---|
| H01L 21/00 | (2006.01) |
| B23K 26/06 | (2014.01) |
| B23K 26/00 | (2014.01) |
| B23K 26/03 | (2006.01) |
| B23K 26/08 | (2014.01) |

(52) U.S. Cl.
CPC ......... B23K 26/0635 (2013.01); B23K 26/0039 (2013.01); B23K 26/0057 (2013.01); B23K 26/032 (2013.01); B23K 26/0639 (2013.01); B23K 26/0853 (2013.01); B23K 2201/40 (2013.01)
USPC .................................. 438/463; 257/E21.599

(58) Field of Classification Search
USPC .................................. 257/E21.599; 438/463
See application file for complete search history.

(56) References Cited

U.S. PATENT DOCUMENTS

2006/0011593 A1* 1/2006 Fukuyo et al. ........... 219/121.67

FOREIGN PATENT DOCUMENTS

| CN | 1993201 | 7/2007 |
|---|---|---|
| CN | 101031382 | 9/2007 |
| CN | 101400475 | 4/2009 |
| KR | 10-2006-0033138 | 4/2006 |
| KR | 10-0749972 | 8/2007 |
| KR | 10-2008-0103508 | 11/2007 |

* cited by examiner

*Primary Examiner* — Marvin Payen
(74) *Attorney, Agent, or Firm* — Lexyoume IP Meister, PLLC

(57) ABSTRACT

There is provided a laser processing method of a sapphire substrate including preparing a sapphire substrate on which plural stacked portions spaced from each other are formed, irradiating a short pulse laser beam from a laser light source, making the laser beam irradiated from the laser light source pass through a beam shaping module, adjusting a position of a light concentrating unit or the sapphire substrate such that the laser beam is concentrated to the inside of the sapphire substrate through the light concentrating unit, and forming a phase transformation area within the sapphire substrate by irradiating the laser beam into the sapphire substrate. The laser beam is introduced into the sapphire substrate while avoiding an area where the stacked portions are formed on the sapphire substrate, so that the phase transformation area is formed within the sapphire substrate.

14 Claims, 10 Drawing Sheets

(a)

(b)

LASER PROCESSING METHOD AND LASER PROCESSING APPARATUS

This invention claims the priority benefit of Korean Patent Application No. 10-2010-0035137 filed on Apr. 16, 2010 and Korean Patent Application No. 10-2010-0035138 filed on Apr. 16, 2010 which are both hereby incorporated by reference in their entirety.

FIELD OF THE INVENTION

The present disclosure relates to a laser processing method and a laser processing apparatus, and particularly relates to a laser processing method and a laser processing apparatus for processing a target object by irradiating a pulse laser to the target object.

BACKGROUND OF THE INVENTION

A LED scribing process is one of examples of a laser processing process using a pulse laser. LED (Light Emitting Diode) is one of light emitting elements using a semiconductor which receives current and emits light. Recently, as a semiconductor technology advances, production of LED elements of high quality has become available. By way of example, it has been generalized that a III-IV group nitride layer is formed on a sapphire substrate by a metal organic chemical vapor deposition (MOCVD) method to produce a blue LED of high luminance.

However, in case where a sapphire substrate is processed with a conventional laser processing apparatus, there has been a problem as follows.

In case where a sapphire substrate is scribed or cut with a conventional laser processing apparatus, the sapphire substrate may have a poor cutting surface and luminance may be decreased, which has been a major problem as LED elements of high luminance are required in recent years. A mechanism of decreasing luminance by a cutting process has not exactly been known, but it has been deemed that an amorphous region formed around a cut region absorb lights, which causes a decrease in luminance.

Further, in case where the sapphire substrate is processed with a conventional laser processing apparatus, fine dust may be generated when the sapphire substrate is cut, which may have a bad influence on element characteristics. In the process using the conventional laser processing apparatus, a cut region of a relatively large area may be formed, and, thus, there has been a limit in integrating a multiple number of functional devices on a single wafer with high density.

Furthermore, by way of example, a stacked portion formed of a nitride layer is formed on a sapphire substrate, and if a laser beam is irradiated passing through the nitride layer, heat may be generated between the substrate and the nitride layer or defects such as cracks or peeling may be generated therebetween.

BRIEF SUMMARY OF THE INVENTION

In view of the foregoing circumstances, the present disclosure provides a laser processing method and a laser processing apparatus suitable for scribing or cutting a target object on which a stacked portion is formed.

In accordance with a first embodiment of the present disclosure, there is provided a laser processing method of a sapphire substrate including preparing a sapphire substrate on which plural stacked portions spaced from each other are formed, irradiating a short pulse laser beam from a laser light source, making the laser beam irradiated from the laser light source pass through a beam shaping module, adjusting a position of a light concentrating unit or the sapphire substrate such that the laser beam is concentrated to the inside of the sapphire substrate through the light concentrating unit, and forming a phase transformation area within the sapphire substrate by irradiating the laser beam into the sapphire substrate. The laser beam is introduced into the sapphire substrate while avoiding an area where the stacked portions are formed on the sapphire substrate, so that the phase transformation area is formed within the sapphire substrate.

In accordance with a second embodiment of the present disclosure, there is provided a laser processing apparatus capable of processing a sapphire substrate on which plural stacked portions spaced from each other are formed. The laser processing apparatus includes a laser light source capable of irradiating a short pulse laser beam, a light concentrating unit capable of concentrating the laser beam from the laser light source to the inside of the sapphire substrate, a beam shaping module positioned between the laser light source and the light concentrating unit, a driving unit capable of driving the light concentrating unit or the sapphire substrate so as to adjust a position of a light concentration point where the laser beam is concentrated within the sapphire substrate, and a controller capable of controlling the driving unit such that the laser beam is introduced into the sapphire substrate while avoiding an area where the stacked portions are formed so as to form a phase transformation area within the sapphire substrate.

The present disclosure provides a laser processing method and a laser processing apparatus suitable for scribing or cutting a target object on which a stacked portion is formed. Particularly, the present disclosure provides a laser processing method and a laser processing apparatus capable of suppressing a decrease in luminance, generating less fine dust, integrating functional devices with high density, and suppressing generation of heat or cracks/peeling between a substrate and a nitride layer. Further, the laser processing method and the laser processing apparatus according to the embodiments of the present disclosure may be applicable to a laser direct polymer patterning (LDPP).

BRIEF DESCRIPTION OF THE DRAWINGS

The present disclosure may best be understood by reference to the following description taken in conjunction with the following figures.

DETAILED DESCRIPTION OF THE INVENTION

Figure 1:
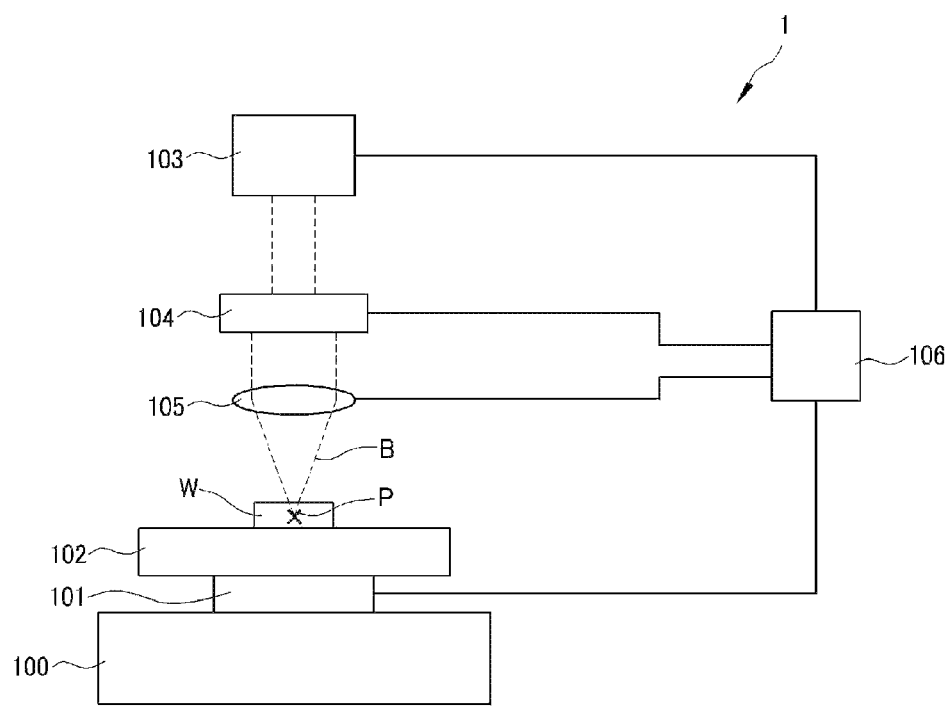
FIG. 1 is a configuration view schematically showing a laser processing apparatus in accordance with an embodiment of the present disclosure.

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "indirectly connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

In the present disclosure, the term "wafer" means a substrate which is not yet cut, the term "LED chip" means a LED chip which can be obtained after a wafer is cut and before a package process is performed, and the term "LED package" means a device having gone through a package process. Further, in the present disclosure, the term "front surface" of a wafer or a substrate means a top surface of a substrate on which a staked portion is formed, and the term "rear surface" of the wafer or the substrate means a bottom surface of the substrate as an opposite side of the front surface.

Hereinafter, embodiments of the present disclosure will be explained in detail with reference to the accompanying drawings.

Figure 2:
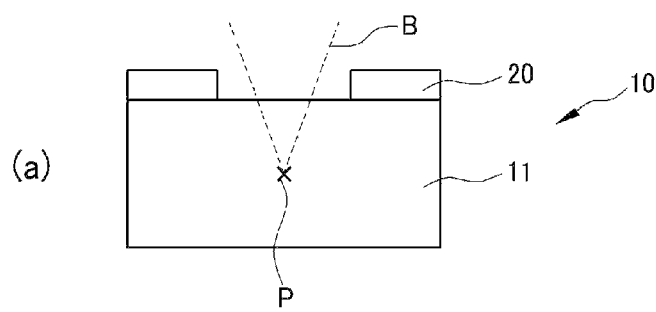
FIGS. 2 and 3 are configuration views for explaining laser processing operations of the laser processing apparatus shown in FIG. 1.
Figure 2:
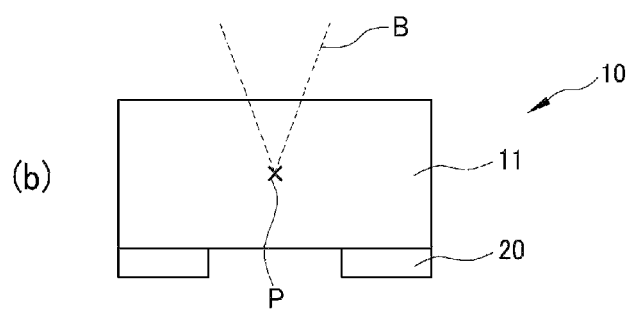
Figure 3:
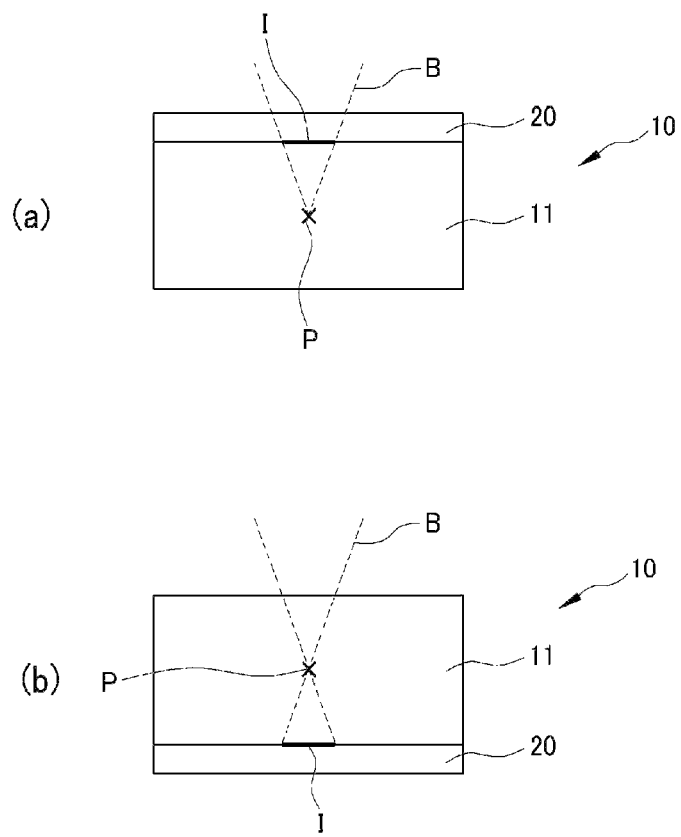

FIG. 1 is a configuration view schematically showing a laser processing apparatus in accordance with an embodiment of the present disclosure, and FIGS. 2 and 3 are configuration views for explaining laser processing operations of the laser processing apparatus shown in FIG. 1

As depicted in FIG. 1, a laser processing apparatus 1 includes a driving unit 101 installed on a frame 100, a mounting table 102 installed on the driving unit 101 so as to be movable horizontally and vertically, a laser light source 103 provided above the mounting table 102, a beam shaping module 104 provided under the laser light source 103, a light concentrating unit 105 provided under the beam shaping module 104, and a controller 106 connected with the driving unit 101, the laser light source 103, the beam shaping module 104, and the light concentrating unit 105 and controlling them.

In FIG. 1, the laser light source 103, the beam shaping module 104, and the light concentrating unit 105 are arranged linearly above the mounting table 102, but they may be arranged in a horizontal direction or in any other direction by using an optical system such as a reflection mirror.

The frame 100 holds thereon the driving unit 101 and the mounting table 102 and may be a three-dimensional structure including a linear frame or a plate made of metal or the like. By way of example, a vibration damper such as a hydraulic damper or an air damper, or an active vibration reduction apparatus may be attached to the frame so as to prevent transmission of vibration from the ground or other apparatuses to the laser processing apparatus 1.

The driving unit 101 is fixed to the frame 100 and holds thereon the mounting table 102 so as to be movable. The driving unit 101 may move the mounting table 102 in a horizontal direction, and, thus, a target object may be processed continuously or intermittently in a plane direction while laser beams are concentrated within the target object. Further, the driving unit 101 may move the mounting table 102 in a vertical direction, and, thus, the target object may be processed continuously or intermittently in the vertical direction such that the laser beams are concentrated within the target object or while the laser beams are concentrated within the target object.

As one example of a process for processing a target object, there is a scribing process in which a laser beam is irradiated into a LED wafer W so as to form a phase transformation area. However, the target object is not limited to the LED wafer W and may include any other material such as a semiconductor or glass containing silicon. The laser processing apparatus in accordance with the embodiment of the present disclosure is useful to process a material of high hardness or high brittleness.

The LED wafer W, i.e., a substrate 10 which is not yet cut includes a sapphire substrate 11 and a stacked portion 20 formed on a top surface thereof (see FIG. 2). The stacked portion 20 may include any one or more of a n-GaN layer, a p-GaN layer, an InGaN layer, a Ga (N,P) layer, a p-electrode layer, and a n-electrode layer, and the details thereof will be described later.

The mounting table 102 mounts a target object such as the sapphire substrate 11 on which the stacked portion 20 is formed. The whole or part of the mounting table 102 may be made of a material transmissive to a laser beam in order to prevent the mounting table 102 from being damaged by a laser beam irradiated toward the mounting table 102.

The laser light source 103 may be any one of a $CO_2$ laser, an excimer laser, a Nd-YAG laser, and a DPSS laser. A laser beam irradiated from the laser light source 103 may be a short pulse laser beam having a wavelength of, for example, about 20 mm or less and a pulse width of, for example, about 100 msec or less. The short pulse laser beam has a short irradiation time and a high power density. In an ablation process using the short pulse laser beam, a material is directly evaporated without a melting process, and, thus, a heat-affected zone is hardly formed around a laser beam-irradiated region and a fine process of high quality can be carried out. Even if in the ablation process with the short pulse laser beam, energy of an individual photon is less than dissociation energy of the material (target object), an ablation process can be carried out when the sum of energy of a multiple number of photons is greater than dissociation energy of the material.

Figure 9:
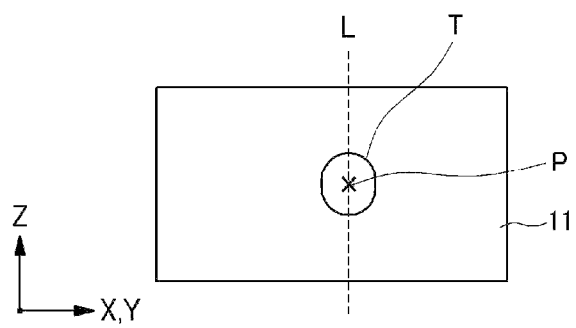
FIGS. 9 to 12 are longitudinal cross-sectional views each showing a sapphire substrate in which a phase transformation area is formed.

The laser light source 103 may irradiate a laser beam which is penetrative to the sapphire substrate 11 or the stacked portion 20 mounted on the sapphire substrate 11, so that a phase transformation area T may be formed only near a light concentration point P without a heat effect to the sapphire substrate 11 or the stacked portion 20 (see FIG. 9).

The beam shaping module 104 increases a diameter of a laser beam irradiated from the laser light source 103, so as to adjust the numerical aperture of the optical system. Further, the beam shaping module 104 increases smoothness of the laser beam.

The light concentrating unit 105 is formed of, for example, a condensing lens and concentrates laser beams from the laser light source 103 toward the sapphire substrate 11.

The controller 106 is connected with the driving unit 101, the laser light source 103, the beam shaping module 104, and the light concentrating unit 105 and controls operations thereof. By way of example, the controller 106 controls the driving unit 101 to move the mounting table 102 in a vertical or a horizontal direction, so that a laser beam may be introduced into the sapphire substrate 11. In this case, the laser beam is concentrated to the inside of the sapphire substrate 11 while avoiding an area where the stacked portion 20 is formed on the top surface of the sapphire substrate 11, so that the phase transformation area T does not reach the surface of the sapphire substrate 11 where the stacked portion 20 is formed. Thus, it is possible to suppress a decrease in luminance of the LED elements. The details thereof will be described later.

As depicted in FIG. 2A, if the light concentration point P is formed within the sapphire substrate 11 while the stacked portion 20 faces upward, an optical path B of the laser beam can be formed while avoiding the area where the stacked portion 20 is formed. Unlike this case, if the stacked portion 20 is formed on the optical path B of the laser beam (see FIG. 3A), a region I of the stacked portion 20 on the optical path B of the laser beam may absorb energy of the laser beam. Thus, the stacked portion 20 may emit its intrinsic photoluminescence light. Photoluminescence is a process in which a substance absorbs energy and is excited and then returns to a lower energy state by emitting the absorbed energy as light. Further, in the region I of the stacked portion 20 on the optical path B of the laser beam, peeling or cracks may occur between the stacked portion 20 and the sapphire substrate 11 due to a heat effect. In order to prevent this, as depicted in FIG. 2A, the controller 106 may control the driving unit 101 such that the laser beam is introduced into the sapphire substrate 11 on which plural stacked portions 20 are spaced from each other while avoiding the area where the stacked portions 20 are formed and the phase transformation area T is formed within the sapphire substrate 11.

As depicted in FIG. 2B, while the stacked portion 20 faces downward, the laser beam may be irradiated such that the light concentration point P is formed within the sapphire substrate 11. In this case, as depicted in FIG. 3B, if the stacked portion 20 is positioned on the optical path B of the laser beam after the light concentration point P (see FIG. 3B), the region I of the stacked portion 20 on the optical path B may emit photoluminescence lights due to overshoot of the laser beam, and peeling or cracks may occur between the stacked portion 20 and the sapphire substrate 11 due to a heat effect.

Therefore, desirably, in any one of the cases shown in FIGS. 2A and 2B, the controller 106 controls the driving unit 101, the laser light source 103, the beam shaping module 104 or the light concentrating unit 105 such that the laser beam is introduced into the sapphire substrate 11 while avoiding the area where the stacked portion 20 is formed and the phase transformation area is formed only within the sapphire substrate 11. Further, desirably, the controller 106 controls the driving unit 101, the laser light source 103, the beam shaping module 104 or the light concentrating unit 105 such that the stacked portion 20 does not emit the photoluminescence light.

There has been explained a case where the driving unit 101 drives the mounting table 102, but it may be possible to install another driving unit for moving the light concentrating unit 105 instead of or together with the driving unit 101 for driving the mounting table 102. In this case, a distance between the mounting table 102 and the light concentrating unit 105 is adjusted by driving the light concentrating unit 105, so that the light concentration point P of the laser beam within the sapphire substrate 11 can be moved in a thickness direction of the sapphire substrate 11. Further, the light concentration point P can be moved in a plane direction.

Figure 4:
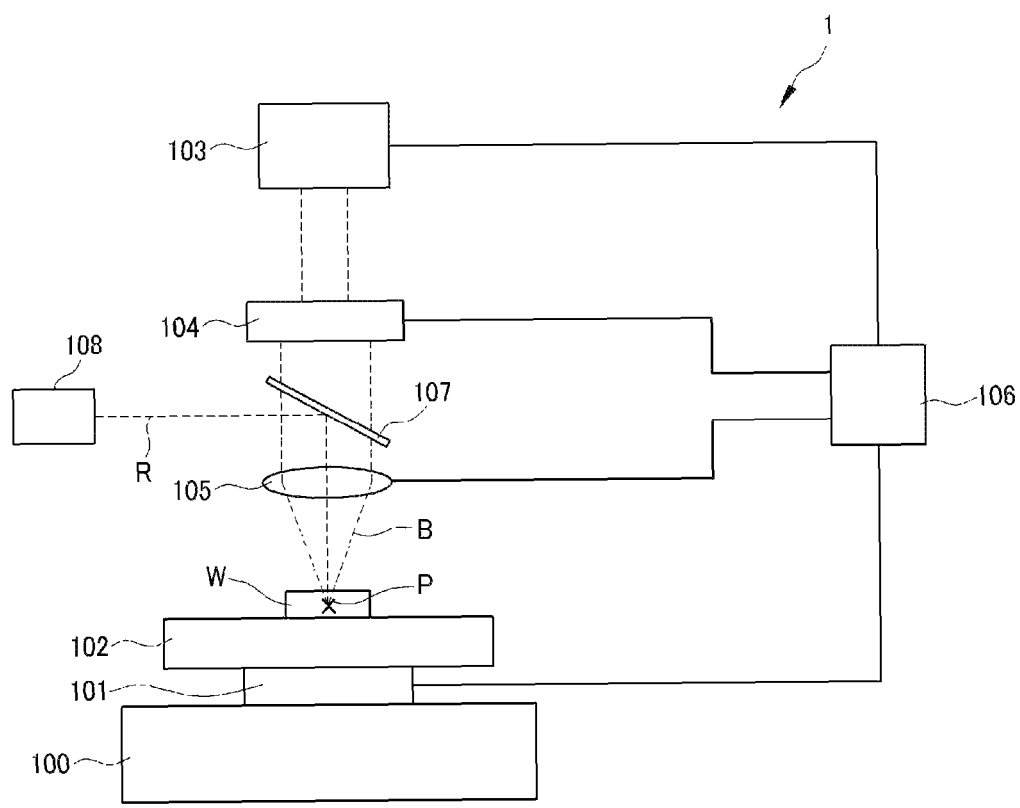
FIG. 4 is a configuration view schematically showing a laser processing apparatus in accordance with another embodiment of the present disclosure.

FIG. 4 is a configuration view schematically showing a laser processing apparatus in accordance with another embodiment of the present disclosure. Like reference numerals denote like parts of the laser processing apparatus explained in the above-described embodiment with reference to FIG. 1 and explanations thereof will be omitted.

In a laser processing apparatus 1 in accordance with the present embodiment, a dichroic mirror 107 is installed between a laser light source 103 and a light concentrating unit 105. The dichroic mirror 107 reflects a light having a specific wavelength range and is transmissive to other lights. The dichroic mirror 107 is prepared to selectively reflect only a light emitted from a stacked portion 20. That is, the dichroic mirror 107 is prepared to be transmissive to a laser beam and a light emitted from the sapphire substrate 11 and to reflect the light emitted from the stacked portion 20.

Thus, a laser beam for processing irradiated from the laser light source 103 toward the sapphire substrate 11 passes through the dichroic mirror 107 and proceeds toward the sapphire substrate 11. At that time, if the stacked portion 20 is formed on the sapphire substrate 11, the stacked portion 20 emits a photoluminescence light caused by the laser beam. The photoluminescence light emitted by the stacked portion 20 is reflected by the dichroic mirror 107 and proceeds to a detection unit 108.

The detection unit 108 detects a photoluminescence light emitted by the stacked portion 20, whereby it is possible to determine whether or not the stacked portion 20 is positioned on an optical path B of the laser beam. Thus, without installing another light source for observation or light source for detection, it is possible to determine whether or not a laser beam is irradiated to the stacked portion 20.

In accordance with the above-described embodiments of the present disclosure (see FIGS. 1 to 3), a laser processing apparatus 1 that processes a sapphire substrate 11 on which plural stacked portions 20 are spaced from each other may include a laser light source 103 that irradiates a laser beam, a light concentrating unit 105 that concentrates laser beams from the laser light source 103 into the sapphire substrate 11, a driving unit 101 that moves the light concentrating unit 105 or the sapphire substrate 11 such that a light concentration point P where the laser beams are concentrated is adjusted within the sapphire substrate 11, and a controller 106 that controls the driving unit 101 such that the laser beam is introduced into the sapphire substrate 11 while avoiding an area where the stacked portion is formed and a phase transformation area is formed within the sapphire substrate 11. Here, the laser light source 103 may oscillate a short pulse laser beam.

Further, the controller 106 may control the driving unit 101 such that the phase transformation area does not reach the front surface or the rear surface of the sapphire substrate 11. A beam shaping module 104 may be further included between the laser light source 103 and the light concentrating unit 105. A mounting table 102 on which the sapphire substrate 11 is mounted may be further included.

In accordance with the embodiments of the present disclosure (see FIG. 4), a detection unit 108 that detects a photoluminescence light emitted by the stacked portion 108 caused by the laser beam may be further included. A diachronic mirror 107 may be further included between the laser light source 103 and the light concentrating unit 105.

The laser light source 103 may include a $CO_2$ laser, an excimer laser, a Nd-YAG laser or a DPSS laser. The laser light source 103 may be a laser light source penetrative to the sapphire substrate 11 or the stacked portion 20. The stacked portion 20 may include a n-GaN layer 12, a p-GaN layer 14, an InGaN layer 13, a p-electrode layer 16 or a n-electrode layer 17 (see FIGS. 5 and 6).

In accordance with the embodiments of the present disclosure (see FIGS. 1 to 3), a laser processing apparatus 1 that processes a target object on which a stacked portion 20 is formed may include a laser light source 103 that irradiates a laser beam, a light concentrating unit 105 that concentrates laser beams from the laser light source 103 into the target object, a driving unit 101 that moves the light concentrating unit 105 or the target object such that a light concentration point P where the laser beams are concentrated is adjusted within the target object, and a controller 106 that controls the driving unit 101 such that the laser beam is introduced into the target object while avoiding an area where the stacked portion is formed and a phase transformation area is formed within the target object. Here, the laser light source 103 may oscillate a short pulse laser beam.

In accordance with the embodiments of the present disclosure (see FIGS. 1 to 3), a laser processing apparatus 1 that processes a target object on which a stacked portion is formed may include a laser light source 103 that irradiates a laser beam, a light concentrating unit 105 that concentrates laser beams from the laser light source 103 into the target object, a driving unit 101 that moves the light concentrating unit 105 or the target object such that a light concentration point P where the laser beams are concentrated is adjusted within the target object, and a controller 106 that controls the laser light source 103, the light concentrating unit 105 or the driving unit 101 such that photoluminescence does not occur between the stacked portion and the target object. Here, the laser light source 103 may oscillate a short pulse laser beam.

In accordance with the embodiments of the present disclosure (see FIGS. 1 to 3), a laser processing apparatus 1 that processes a target object on which a stacked portion is formed may include a laser light source 103 that irradiates a laser beam, a light concentrating unit 105 that concentrates laser beams from the laser light source 103 into the target object, a driving unit 101 that moves the light concentrating unit 105 or the target object such that a light concentration point P where the laser beams are concentrated is adjusted within the target object, and a controller 106 that controls the laser light source 103, the light concentrating unit 105 or the driving unit 101. The controller 106 may control the laser light source 103, the light concentrating unit 105 or the driving unit 101 such that the laser beam is introduced into the target object and a phase transformation area is formed within the target object and such that photoluminescence does not occur between the stacked portion and the target object.

Hereinafter, there will be explained a method of processing a target object using the laser processing apparatus 1. Although there will be explained a case where a LED chip is fabricated by scribing or cutting a LED wafer, the present invention is not limited to this embodiment.

Figure 5:
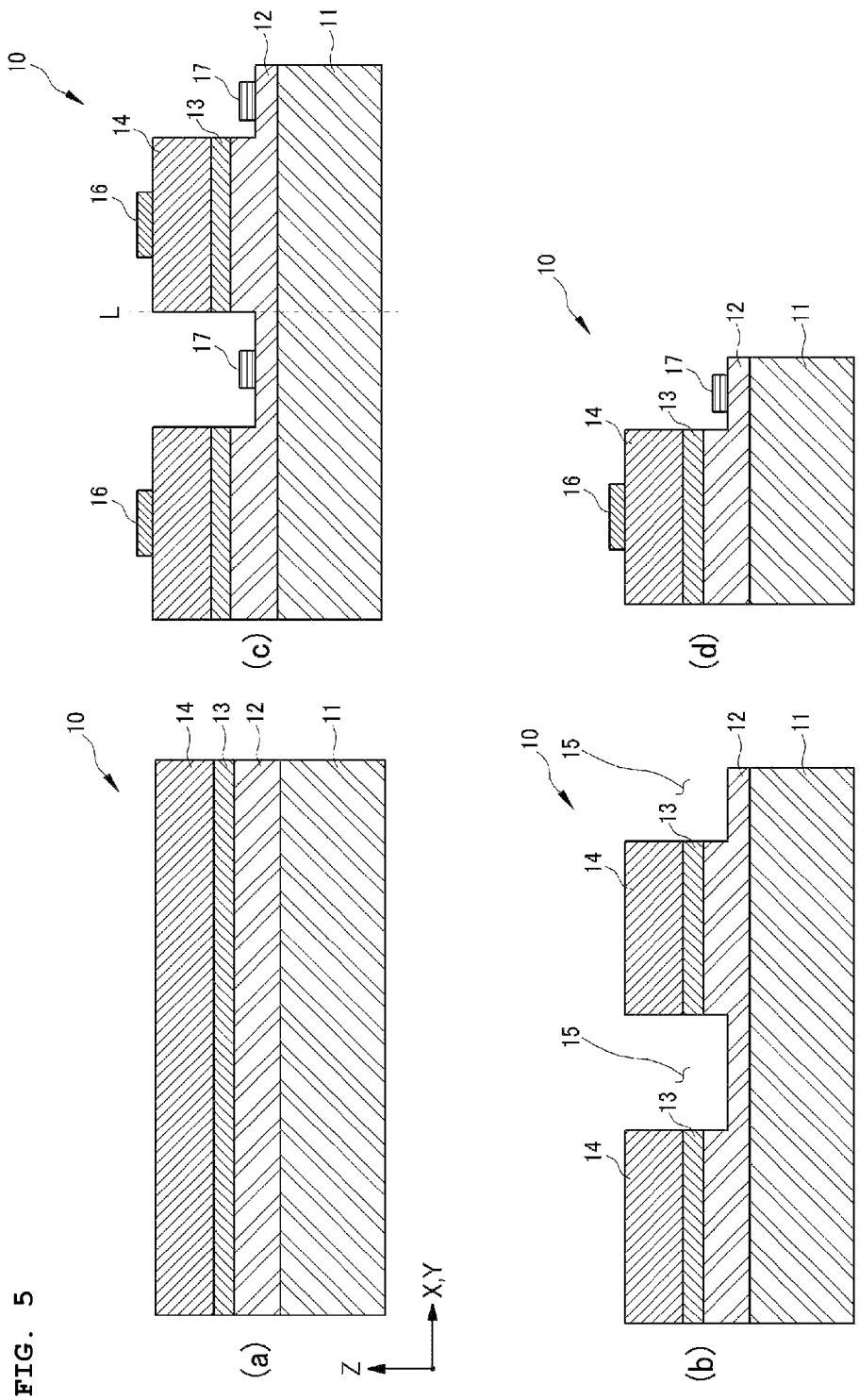
FIG. 5 is a process cross-sectional view showing an example of processing a target object using a laser processing apparatus in accordance with an embodiment of the present disclosure.
Figure 6:
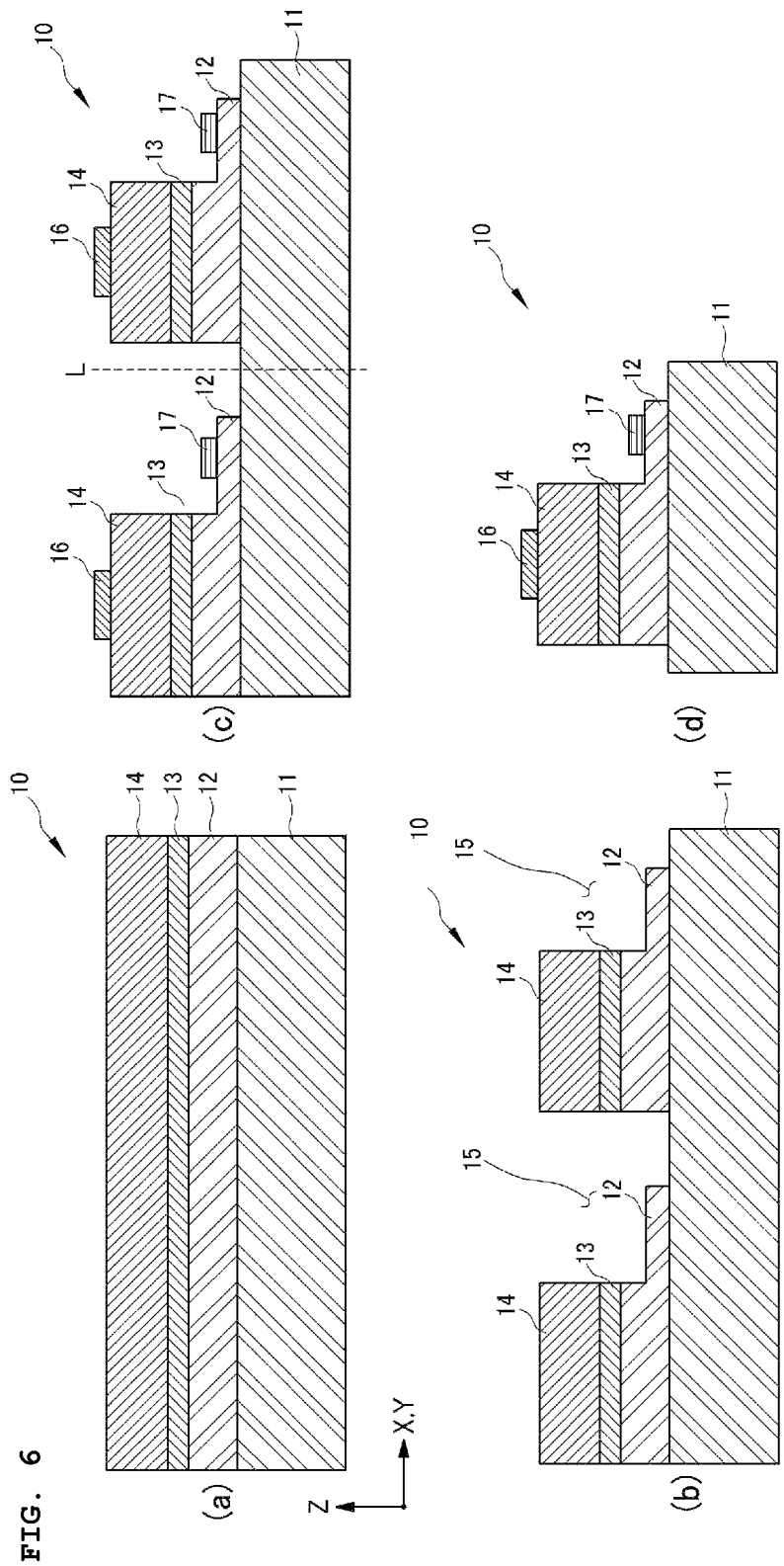
FIG. 6 is a process cross-sectional view showing another example of processing a target object using a laser processing apparatus in accordance with an embodiment of the present disclosure.
Figure 7:
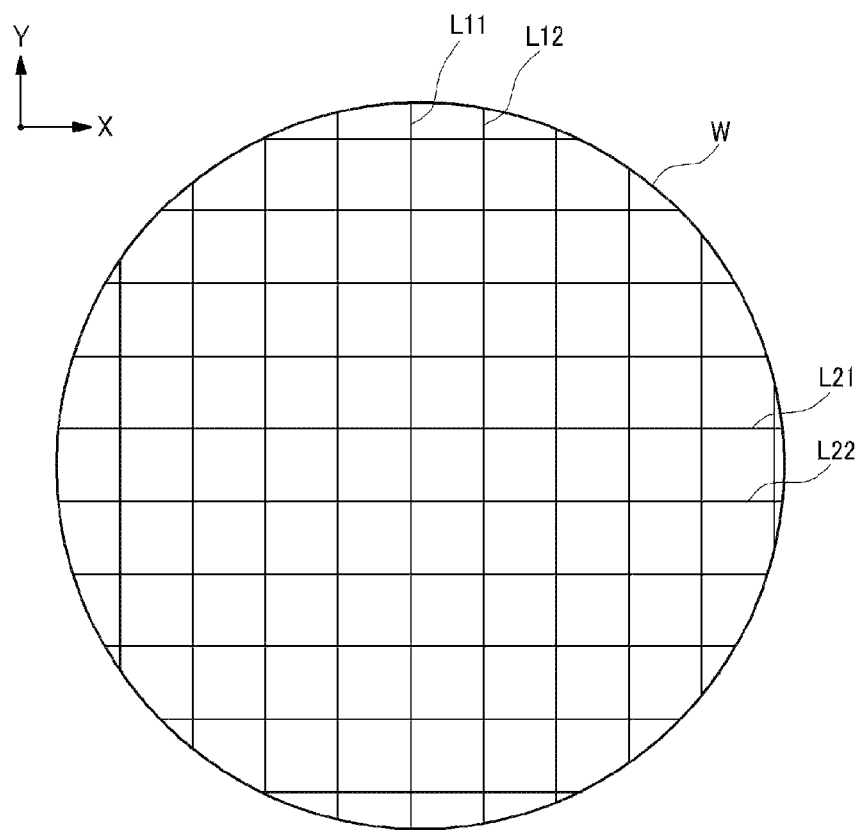
FIG. 7 is a plane view schematically showing a sapphire substrate.
Figure 8:
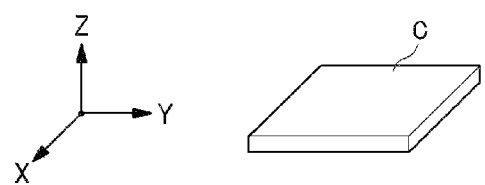
FIG. 8 is a perspective view schematically showing a LED chip.

FIG. 5 is a process cross-sectional view showing an example of processing a target object using a laser processing apparatus in accordance with an embodiment of the present disclosure, and FIG. 6 is a process cross-sectional view showing another example of processing a target object using a laser processing apparatus in accordance with an embodiment of the present disclosure. FIG. 7 is a plane view schematically showing a sapphire substrate, and FIG. 8 is a perspective view schematically showing a LED chip.

Referring to FIG. 5, in order to fabricate a LED chip 10, a sapphire substrate 11 is prepared and plural nitride layers 12 to 14 are stacked on the sapphire substrate 11 to form a stacked portion (see FIG. 5A). The nitride layers 12 to may be formed by epitaxial growth using, for example, a MOCVD method. To be specific, a n-GaN layer 12 is formed on the sapphire substrate 11, an InGaN layer 13 is formed on the n-GaN layer 12 and then a p-GaN layer 14 is formed on the InGaN layer 13. By forming the InGaN layer 13 as a light emitting material, a blue light of high luminance or a green light can be obtained.

Thereafter, in order to form electrodes and separate an element, a recess 15 is formed by etching part of the p-GaN layer 14, InGaN layer 13 and n-GaN layer 12 (see FIG. 5B). The recess 15 can be formed by, for example, a RIE (reactive ion etching) method. Thus, a partial area of a top surface of the n-GaN layer 12 becomes exposed to a bottom surface of the recess 15.

Then, a p-electrode layer 16 is formed on the p-GaN layer 14 and a n-electrode layer 17 is formed on the n-GaN layer 12 (see FIG. 5C). These electrode layers 16 and 17 may be made of metal such as Au, Ni, Ti, Cr or the like. These metal electrode layers 16 and 17 are connected to an external power supply through a lead, so that a LED element emits lights.

The substrate 11 is cut along a preset cut line L shown in FIG. 5C and a LED chip 10 as shown in FIG. 5D can be obtained. FIG. 5 illustrates a case where two LED chips are fabricated, but actually, several hundred to several thousand LED chips C can be fabricated with a single wafer W (see FIGS. 7 and 8).

Since the above-mentioned MOCVD method and the RIE method have been well known, detailed explanations thereof will be omitted. In the above-described embodiments, the MOCVD method and the RIE method have been described as a nitride layer forming method and an etching method, respectively, but the present invention is not limited thereto. Any of the other well-known methods can be employed as a nitride layer forming method and an etching method.

In the above-described embodiments, the stacked portion is formed of nitride layers and metal layers made up of the n-GaN layer 12, the InGaN layer 13, the p-GaN layer 14, the p-electrode layer 16, and the n-electrode layer 17, but the present invention is not limited thereto. By way of example, a non-doped GaN layer may be formed between the substrate 11 and the n-GaN layer 12 so as to improve lattice match therebetween, and an ohmic contact metal layer may be formed between the p-GaN layer 14 and the p-electrode layer 16 so as to be electrically connected therebetween.

A cutting process of the substrate 11 will be explained in detail later.

FIG. 6 shows another embodiment of processing a target object. The present embodiment is the same as the above-described embodiments except that when a recess 15 is formed, a partial area of a top surface of a substrate 11 is exposed. Therefore, like reference numerals denoted in FIG. 5 will be used hereinafter.

Above all, a n-GaN layer 12, an InGaN layer 13, and a p-GaN layer 14 are stacked in sequence on a sapphire substrate (see FIG. 6A).

Then, a recess 15 is formed by etching the n-GaN layer 12, the InGaN layer 13, and the p-GaN layer 14 (see FIG. 6B). A partial area of a top surface of the n-GaN layer 12 and a partial area of a top surface of the substrate 11 are exposed to a bottom surface of the recess 15. Therefore, the recess 15 is formed into a step shape to which the p-GaN layer 14, the n-GaN layer 12, and the substrate 11 are exposed in sequence. The exposed partial area of the top surface of the substrate is used to be cut in a later process. That is, in the above-described embodiments relevant to FIG. 5, the substrate 11 and the n-GaN layer 12 are cut and separated in order to form a LED chip, but in the present embodiment, only the substrate 11 needs to be cut and a cutting process is performed more efficiently. When the substrate 11 and the n-GaN layer 12 are cut, an external force is applied to them. If a partial area of the top surface of the substrate 11 is exposed and spaced from the n-GaN layer 12, occurrence of peeling or cracks between the substrate 11 and the n-GaN layer 12 is remarkably decreased due to the external force.

Subsequently, a p-electrode layer 16 is formed on the p-GaN layer 14 and a n-electrode layer 17 is formed on the n-GaN layer 12 (see FIG. 6C).

Then, the substrate 11 is cut along a preset cut line L shown in FIG. 6C and a LED chip 10 as shown in FIG. 6D can be obtained.

Hereinafter, a method of cutting a substrate 11 will be explained with reference to FIGS. 9 to 13.

Figure 11:
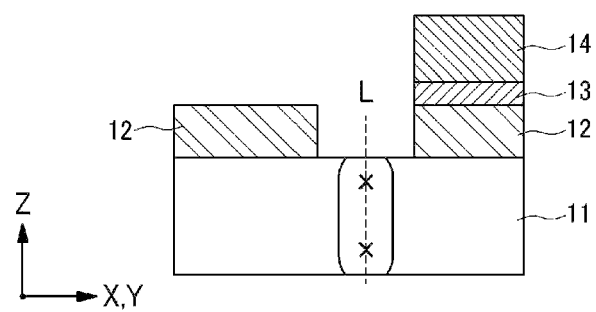
Figure 12:
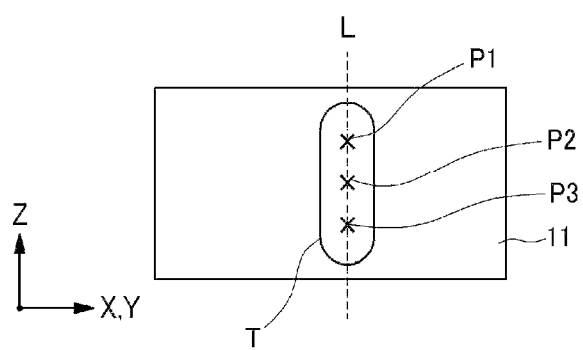
Figure 13:
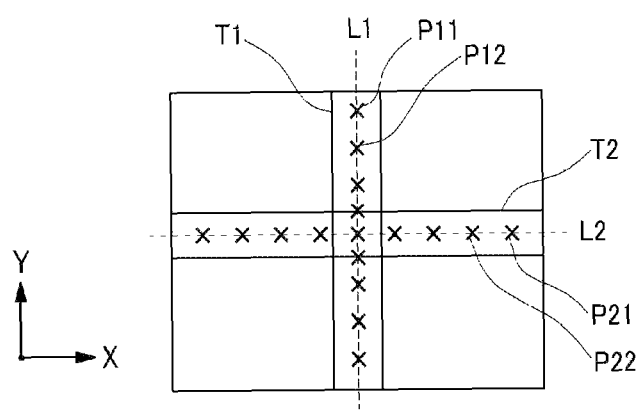
FIG. 13 is a planar cross-sectional view showing a sapphire substrate in which two crossed phase transformation areas are formed.

FIGS. 9 to 12 are longitudinal cross-sectional views each showing a sapphire substrate in which a phase transformation area is formed, and FIG. 13 is a planar cross-sectional view showing a sapphire substrate in which two crossed phase transformation areas are formed. For the sake of convenience, FIGS. 9, 10, and 12 do not illustrate a stacked portion formed on a sapphire substrate.

According to a LED chip forming method using a laser processing apparatus in accordance with the present disclosure, as explained in the above-described embodiments, a sapphire substrate 11 on which plural stacked portions (for example, nitride layers and metal electrode layers) 20 spaced from each other are formed is prepared. Then, a laser beam is irradiated to the sapphire substrate 11 while avoiding an area where the stacked portions 20 are formed, and a phase transformation area T is formed within the sapphire substrate 11 by irradiating the laser beam. Here, the phase transformation area T is controlled so as not to reach a surface of the sapphire substrate 11 where the stacked portions 20 are formed and a rear surface thereof. Thereafter, the sapphire substrate 11 is cut by using the phase transformation area T and a LED chip can be obtained.

A process of forming the phase transformation area T on the sapphire substrate 11 will be explained in detail as follows.

By using a laser processing apparatus 1 as shown in FIGS. 1 to 4, laser beams are irradiated to a light concentration point P which is any one point within the sapphire substrate 11. This light concentration point P is set to be on a preset cut line L (see FIG. 9).

The laser beams irradiated to the sapphire substrate 11 may be solid-state lasers such as Nd-YAG lasers. The laser beams are irradiated from one or more laser light sources and concentrated on the light concentration point P passing through a beam shaping module and a condensing lens.

The light concentration pint P and the phase transformation area T around the light concentration pint P are formed within the sapphire substrate 11, but the phase transformation area T is not formed in the other area, i.e., the surface of the sapphire substrate 11 or the stacked portion 20. In order to do so, the laser beam may be penetrative to the sapphire substrate 11 or the stacked portion positioned on an optical path of the laser beam. Any laser light source may be used if it satisfies this condition. By way of example, other than the Nd-YAG laser, a $CO_2$ laser, an excimer laser, and a DPSS laser may be used.

In the embodiments of the present disclosure, it may be possible to use a pulse laser beam having a wavelength of about 20 mm or less and a pulse width of about 100 msec or less as the laser beam. By locally introducing energy into a small area within the sapphire substrate 11, the phase transformation area T may be formed only within the substrate 11 so as not to be in contact with the front surface or the rear surface of the sapphire substrate 11 as depicted in FIG. 9.

Accordingly, in a finished LED package, the phase transformation area T, such as an amorphous area, is not formed or formed in a relatively small area near the front surface or the rear surface of the substrate 11 positioned on a path along which a light generated from a light emitting layer is transmitted to the outside. Therefore, a decrease in luminescence can be suppressed.

Figure 10:
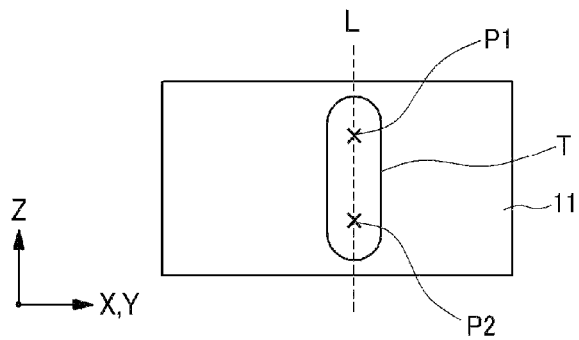

FIG. 10 shows a formation of a phase transformation area T in accordance with another embodiment of the present disclosure.

In accordance with the present embodiment, a laser beam is continuously moved between two points positioned on a preset cut line L within a sapphire substrate 11, so that a phase transformation area T is formed to be extended in a thickness direction (z-axis) of the substrate 11. One of the two points near a surface of the sapphire substrate 11 is referred to as a first light concentration point or a first area P1 and the other point near a rear surface of the sapphire substrate 11 is referred to as a second light concentration point or a second area P2. In the present embodiment, a phase transformation area T is formed by moving a light concentration point (light concentration area) of the laser beam from the first area P1 to the second area P2. Otherwise, a phase transformation area T may be formed by moving a light concentration point (light concentration area) of the laser beam from the second area P2 to the first area P1. The present embodiment is the same as the above-described embodiment explained with reference to FIG. 9 except that the phase transformation area T is continuously formed.

In the present embodiment, the phase transformation area T is not in contact with the front surface or the rear surface of the sapphire substrate 11 in the same manner as the embodiment explained with reference to FIG. 9.

However, as described above with reference to FIG. 6, if a partial area of a top surface of the sapphire substrate 11 is exposed and any one stacked portion 12 to 14 is completely spaced from its adjacent stacked portion 12 to 14, the phase transformation area T formed within the substrate 11 may be in contact with part of the surface or rear surface of the substrate 11. That is, as depicted in FIG. 11, if a staked portion formed of plural nitride layers 12 to 14 is completely spaced from its adjacent stacked portion, when a phase transformation area T is formed by continuously moving a light concentration area of the laser beam from the first area P1 to the second area P2 or from the second area P2 to the first area P1, the phase transformation area T may be formed so as to be in contact with the front surface or the rear surface of the substrate 11. Even in this case, the phase transformation area T is not in contact with the stacked portions.

FIG. 12 shows a formation of a phase transformation area T in accordance with still another embodiment of the present disclosure. Unlike the above-described embodiments, in the present embodiment, laser beams are concentrated on plural, for example, three light concentration areas P1, P2 and P3 within a sapphire substrate 11 and a phase transformation area T is formed. That is, a phase transformation area is formed by concentrating the laser beams on the light concentration point P1 and the laser beams are concentrated on the light concentration area while the light concentration area is moved to the point P2 and the point P3 in sequence. Consequently, a phase transformation area T is formed as depicted in FIG. 12.

FIG. 13 shows two crossed phase transformation areas as viewed from a plane (x-y plane) of a sapphire substrate 11. In order to form LED chips by cutting the sapphire substrate 11, the sapphire substrate 11 needs to be cut in an orthogonal direction as viewed from the plane. In order to do so, by way of example, a phase transformation area is formed along plural preset cut lines L11, L12, etc. arranged in a y-axis direction of the sapphire substrate 11 and plural preset cut lines L21, L22, etc. arranged in an x-axis direction of the sapphire substrate 11 so as to be orthogonal to the preset cut lines L11, L12, etc and then the substrate 11 is cut along the preset cut lines from the phase transformation area, so that LED chips can be obtained (see FIGS. 7 and 8).

In order to do so, as depicted in FIG. 13, a laser beam is irradiated to plural light concentration points P11 and P12 along a preset cut line L1 positioned in the y-axis direction within the sapphire substrate 11, so that a first phase transformation area T1 is formed to be extended in the y-axis direction, and then a laser beam is irradiated to plural light concentration points P21 and P22 along a preset cut line L2 positioned in the x-axis direction within the sapphire substrate 11, so that a second phase transformation area T2 is formed to be extended in the x-axis direction.

In order to form the first phase transformation area T1, a laser beam may be irradiated to each of the plural light concentration points P11 and P12 as described above or a laser beam may be irradiated continuously along a preset cut line L1. In order to form the second phase transformation area T2, a laser beam may be irradiated to each of the plural light concentration points P21 and P22 as described above or a laser beam may be irradiated continuously along the preset cut line L2.

As depicted in FIGS. 9 to 13, after a phase transformation area T is formed within a sapphire substrate 11, the substrate 11 is cut from this phase transformation area T along a preset cut line L and LED chips can be obtained.

To be specific, an external force applied from the outside to the phase transformation area T causes cracks from the phase transformation area T in a direction toward a front surface or a rear surface of the sapphire substrate 11 and the sapphire substrate 11 can be cut.

By way of example, both sides of the sapphire substrate 11 with the preset cut line L as the center are fixed with jigs or the like and the both sides of the sapphires substrate 11 with the preset cut line L as the center are bent into a pyramid shape, or a pressing member having a tip is moved upward from the rear surface of the sapphire substrate 11 along the preset cut line L, so that an external force can be applied upward from the rear surface of the substrate 11. In this case, cracks occur from the phase transformation area T in a direction toward the surface of the sapphire substrate 11 made of a material of high brittleness and the sapphire substrate 11 can be cut.

Alternatively, the substrate 11 can be cut by applying an external force downward from the surface of the substrate 11. That is, the both sides of the sapphire substrate 11 with the preset cut line L as the center are fixed with jigs or the like and the both sides of the sapphires substrate 11 with the preset cut line L as the center are bent into a pyramid shape, or a pressing member having a tip is moved downward from the surface of the sapphire substrate 11 along the preset cut line L, so that an external force can be applied downward from the surface of the substrate 11. In this case, cracks occur from the phase transformation area T in a direction toward the rear surface of the sapphire substrate 11 and the sapphire substrate 11 can be cut.

Otherwise, the sapphire substrate 11 can be cut by applying a tensile force to the substrate 11 in a plane direction. By way of example, after an extension film (not illustrated) is attached to a lower side of the sapphire substrate 11, the sapphire substrate 11 is divided by extending the extension film in the plane direction, and, thus, the substrate 11 can be cut from the preset cut line L where the phase transformation area T is formed. Then, the extension film is removed from the sapphire substrate 11.

The advantage of this method is that an external force can be applied to the entire sapphire substrate 11 and the substrate 11 can be cut in one process. There has been explained a case where the extension film is attached to the rear surface of the substrate 11 to cut the substrate 11, but the extension film can be attached to the surface of the substrate 11 to cut the substrate 11. Further, the extension film may be attached to both the surface and the rear surface of the substrate 11 or a protective film may be attached to any one of the surface and the rear surface of the substrate 11 to perform a cutting process.

As described above, in accordance with the embodiments of the present disclosure (see FIGS. 1 to 3 and 5 to 9), a laser processing method of a sapphire substrate may include a process of preparing a sapphire substrate 11 on which plural stacked portions spaced from each other are formed, a process of irradiating a laser beam from a laser light source 103, a process of adjusting a position of a light concentrating unit 105 or the sapphire substrate 11 such that the laser beam can be concentrated to the inside of the sapphire substrate 11 through the light concentrating unit 105, and a process of forming a phase transformation area within the sapphire substrate 11 by irradiating the laser beam into the sapphire substrate 11. Here, the laser beam is introduced into the sapphire substrate 11 while avoiding an area where the stacked portions are formed on the sapphire substrate and the laser light source 103 may oscillate a short pulse laser beam.

The phase transformation area formed within the sapphire substrate may not reach a front surface or a rear surface of the sapphire substrate.

Further, the laser beam irradiated from the laser light source 103 may pass through a beam shaping module 104. The laser light source 103 may include a CO2 laser, an excimer laser, a Nd-YAG laser or a DPSS laser. The laser light source 103 may be a laser light source penetrative to the sapphire substrate 11 or the stacked portions. The stacked portions may include a n-GaN layer, a p-GaN layer, an InGaN layer, a p-electrode layer or a n-electrode layer.

The embodiments of the present disclosure may further include a process of detecting photoluminescence lights emitted by the stacked portions 20 due to the laser beam. Further, the photoluminescence lights emitted by the stacked portions 20 due to the laser beam may be incident to a detection unit 108 through a dichroic mirror 107 provided between the laser light source 103 and the light concentrating unit 105 (see FIG. 4).

In the process of forming the phase transformation area within the sapphire substrate 11, the phase transformation area may be formed by moving a light concentration area of the laser beam within the sapphire substrate 11 from a first area near a surface of the sapphire substrate 11 to a second area near a rear surface of the sapphire substrate 11. Alternatively, in the process of forming the phase transformation area within the sapphire substrate 11, the phase transformation area may be formed by moving a light concentration area of the laser beam within the sapphire substrate 11 from the second area near the rear surface of the sapphire substrate 11 to the first area near the surface of the sapphire substrate 11 (see FIG. 10).

Otherwise, in the process of forming the phase transformation area within the sapphire substrate 11, the phase transformation area may be formed by concentrating the laser beam to plural areas within the sapphire substrate 11 in a thickness direction (see FIGS. 10 to 12). Further, in the process of forming the phase transformation area within the sapphire substrate 11, plural first phase transformation areas and second transformation areas crossed with each other as viewed from a plane of the sapphire substrate 11 may be formed (see FIG. 13).

The embodiments of the present disclosure may further include a process of cutting the sapphire substrate with the phase transformation area as a starting point. In the process of cutting the sapphire substrate, the sapphire substrate 11 may be cut by applying an external force to the phase transformation area and generating cracks from the phase transformation area in a direction toward a front surface or a rear surface of the sapphire substrate 11. Alternatively, in the process of cutting the sapphire substrate, the sapphire substrate 11 may be cut by applying an external force from the rear surface of the sapphire substrate 11 and generating cracks from the phase transformation area in a direction toward the surface of the sapphire substrate 11. Otherwise, in the process of cutting the sapphire substrate, the sapphire substrate 11 may be cut by applying an external force from the surface of the sapphire substrate 11 and generating cracks from the phase transformation area in a direction toward the rear surface of the sapphire substrate 11. Further, the process of cutting the sapphire substrate 11 may include a process of cutting the sapphire substrate 11 by using the phase transformation area and a process of spacing the cut sapphire substrates 11 from each other. Furthermore, the process of cutting the sapphire substrate 11 may include a process of attaching an extension film to an upper side or a lower side of the sapphire substrate 11 and a process of dividing the sapphire substrate 11 by extending the extension film in a plane direction.

In accordance with the embodiments of the present disclosure (see FIGS. 1 to 3 and 5 to 9), in a laser processing method of processing a target object on which a stacked portion is formed, a phase transformation area is formed by concentrating a laser beam into the target object. Here, in order not to incur an optical or thermal reaction in the stacked portion, the laser beam may be irradiated to the target object while avoiding the stacked portion and the laser beam may be irradiated such that the phase transformation area formed within the target object does not actually reach the stacked portion.

The optical or thermal reaction refers all kinds of reactions such as photoluminescence generated in the stacked portion due to irradiation of a laser beam and a transformation or a change in a material between the stacked portion and the target object or within the stacked portion due to heat caused by the laser beam.

In accordance with the embodiments of the present disclosure (see FIGS. 1 to 3 and 5 to 9), the laser processing method my include a process of preparing of preparing a target object on which plural stacked portions spaced from each other are formed, a process of irradiating a laser beam from a laser light source 103, a process of adjusting a position of a light concentrating unit 105 or the sapphire substrate 11 such that the laser beam can be concentrated to the inside of the target object through the light concentrating unit 105, and a process of forming a phase transformation area within the target object by irradiating the laser beam into the target object. Here, the laser beam is introduced into the target object while avoiding an area where the stacked portions are formed on target object and the laser light source 103 may oscillate a short pulse laser beam.

Further, in accordance with the embodiments of the present disclosure (see FIGS. 1 to 3 and 5 to 9), the laser processing method my include a process of preparing of preparing a target object on which plural stacked portions spaced from each other are formed, a process of irradiating a laser beam from a laser light source 103, a process of adjusting a position of a light concentrating unit 105 or the sapphire substrate 11 such that the laser beam can be concentrated to the inside of the target object through the light concentrating unit 105, and a process of irradiating the laser beam into the target object such that photoluminescence does not occur between the stacked portions and the target object. Here, the laser light source 103 may oscillate a short pulse laser beam.

In accordance with the embodiments of the present disclosure (see FIGS. 1 to 3 and 5 to 9), the laser processing method my include a process of preparing of preparing a target object on which plural stacked portions spaced from each other are formed, a process of irradiating a laser beam from a laser light source 103, a process of adjusting a position of a light concentrating unit 105 or the sapphire substrate 11 such that the laser beam can be concentrated to the inside of the target object through the light concentrating unit 105, and a process of forming a phase transformation area within the target object by irradiating the laser beam into the target object. Here, in order not to generate photoluminescence between the stacked portions and the target object, the laser beam is introduced into the target object while avoiding an area where the stacked portions are formed on target object.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention. By way of example, each component described to be of a single type can be implemented in a distributed manner. Likewise, components described to be distributed can be implemented in a combined manner.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. A laser processing method of a sapphire substrate in a light emitting diode (LED) element comprising:
   preparing a sapphire substrate on which plural stacked portions spaced from each other are formed;
   irradiating a short pulse laser beam from a laser light source;
   making the laser beam irradiated from the laser light source pass through a beam shaping module;
   adjusting a position of a light concentrating unit or the sapphire substrate such that the laser beam is concentrated to the inside of the sapphire substrate of the LED element through the light concentrating unit and a phase transformation area is formed within the sapphire substrate; and
   detecting photoluminescence light emitted by the stacked portions due to the laser beam,
   wherein the photoluminescence light is incident to a detection unit through a dichroic mirror provided between the laser light source and the light concentrating unit, and when the detection unit detects the photoluminescence light, the laser beam is controlled so as to be introduced into the sapphire substrate while avoiding an area where the stacked portions are formed on the sapphire substrate.

2. The laser processing method of claim 1, wherein the phase transformation area formed within the sapphire substrate does not reach a front surface or a rear surface of the sapphire substrate.

3. The laser processing method of claim 1, wherein the laser beam is penetrative to the sapphire substrate or the stacked portions.

4. The laser processing method of claim 1, wherein the stacked portions includes one or more of a n-GaN layer, a p-GaN layer, an InGaN layer, a p-electrode layer, and a n-electrode layer.

5. The laser processing method of claim 1, wherein in the process of forming the phase transformation area within the sapphire substrate, the phase transformation area is formed by concentrating the laser beam to plural areas within the sapphire substrate in a thickness direction.

6. The laser processing method of claim 1, wherein in the process of forming the phase transformation area within the sapphire substrate, plural first phase transformation areas and second transformation areas crossed with each other as viewed from a plane of the sapphire substrate are formed.

7. The laser processing method of claim 1, further comprising: cutting the sapphire substrate with the phase transformation area as a starting point.

8. The laser processing method of claim 7, wherein in the process of cutting the sapphire substrate, the sapphire substrate is cut by applying an external force to the phase transformation area and generating cracks from the phase transformation area in a direction toward a front surface or a rear surface of the sapphire substrate.

9. The laser processing method of claim 7, wherein the process of cutting the sapphire substrate includes attaching an extension film to an upper side or a lower side of the sapphire substrate and dividing the sapphire substrate by extending the extension film in a plane direction.

10. The laser processing method of claim 1, wherein the laser light source, the beam shaping module, and the light concentrating unit are arranged linearly along a same axis.

11. The laser processing method of claim 10, wherein the beam shaping module is provided below the laser light source.

12. The laser processing method of claim 11, wherein the light concentrating unit is provided below the beam shaping module.

13. The laser processing method of claim 10, wherein the dichroic mirror is provided between beam shaping module and the light concentrating unit.

14. The laser processing method of claim 1, wherein the laser beam irradiated from the laser light source is directly transmitted to the beam shaping module.

* * * * *